United States Patent Office 3,705,139
Patented Dec. 5, 1972

3,705,139
HIGH MOLECULAR COMPOSITION
Izumi Yamane, Yokohama, Masuzo Nagayama, Tokyo, and Makoto Takai, Chiba, Japan, assignors to Lion Fat & Oil Co., Ltd., Tokyo, Japan
No Drawing. Filed Oct. 26, 1970, Ser. No. 84,164
Claims priority, application Japan, Oct. 30, 1969, 44/86,422, 44/86,423
Int. Cl. C08f 3/02, 7/04, 45/00
U.S. Cl. 260—92.8 A                 9 Claims

ABSTRACT OF THE DISCLOSURE

A high molecular composition comprising a high molecular substance containing one member selected from the group consisting of alkyl sulfide compounds as an antistatic agent, said compounds being expressed by the following General Formulas a and b:

(a) $\quad R_1 \cdot S \cdot R_2 \cdot A(R_3\!-\!O)nZ$ (wherein $R_1$ represents a hydrocarbon radical having 6–22 carbon atoms; $R_2$ and $R_3$ each represents a hydrocarbon radical having 1–4 carbon atoms; A represents oxygen or nitrogen, and, in case A represents nitrogen, said general formula is represented by

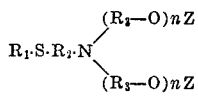

$n$ represents an integer in the range of 0–100; and Z represents hydrogen or $COR_4$ wherein $R_4$ represents a hydrocarbon radical having 1–22 carbon atoms); and (b) $\quad\overset{O}{\underset{\uparrow}{R_1 \cdot S}}\!-\!R_2 \cdot O(R_3\!-\!O)nH$ (wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

BACKGROUND OF THE INVENTION (a) Field of the invention

The present invention relates to an antistatic composition comprising essentially of a high molecular substance, which retains the intrinsic properties of said high molecular substance without any deterioration thereof.

(b) Description of the prior art

It is generally known that the manufacturing or processing of a high molecular substance or the use of a product comprising essentially of said substance would be accompanied by such electrostatic troubles as dust-catching, electric shock, and so on, and as preventive measures therefor, antistatic high-molecular substances are utilized. Said antistatic high-molecular substance is generally prepared by coating, spraying or dipping a solution of some surface active agent having antistatic property on or to a high molecular substance. However, the efficiency of thus produced antistatic high-molecular substance is apt to be temporary and easily deteriorate due to friction, washing, lapse of time, etc. to thereby disappear at last. As a means to sustain the antistatic efficiency, there is known a method of kneading a surface active agent into said substance. Even thus prepared high molecular composition, however, is accompanied by such drawbacks that, the surface active agent runs out in rich amount onto the surface of the composition to make the surface soft and sticky, impede the transparency thereof, deteriorate the intrinsic characteristics of high molecular substance such as strength, thermal resistance, stability against light, heat and oxidation, and so forth. This is attributable to a functional defect of a conventional surface active agent hitherto employed as an antistatic agent. For example, in case of alkylamine-ethylene oxide adduct or compounds composed thereof which are currently popular on market as antistatic agents for use in blending, they are too poor in thermal resistance or thermal stability to mold with a high molecular substance so that they are available only for a limited purpose in polystyrene and ABS resin which require particularly high temperature for molding. In case of polypropylene, polyethylene, or the like, the antistatic agent would run out unceasingly with the lapse of time, to thereby not only impede the transparency and printability but also accelerate the adhesion of dust due to increase in viscosity of the surface thereof. In case of employment for polyvinyl chloride, too, the conventional antistatic agents are possessed of shortcomings, such that they accelerate pyrolysis thereof, and so on.

SUMMARY OF THE INVENTION

The present invention is a result of energetic studies on how to make up for the defects in the prior art, and is intended to provide a composition comprising essentially of a high molecular substance that will not only never impede the intrinsic properties of said high molecular substance but also be capable of preventing deterioration of the efficiency of the substance against light, heat and oxygen and possessed of enduring antistatic property.

In other words, the present invention is to provide an antistatic high molecular composition comprising essentially of a high molecular substance containing one member selected from the group consisting of alkyl sulfide compounds which are expressed by the following General Formulas a and b:

(a) $\quad R_1 \cdot S\!-\!R_2 \cdot A \cdot (R_3\!-\!O)nZ$ (wherein $R_1$ represents a hydrocarbon radical having 6–22 carbon atoms; $R_2$ and $R_3$ each represents a hydrocarbon radical having 1–4 carbon atoms; A represents oxygen or nitrogen, and, in case A represents nitrogen, said general formula is represented by

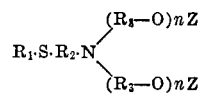

$n$ represents an integer in the range of 0–100; and Z represents hydrogen or $COR_4$ wherein $R_4$ represents a hydrocarbon radical having 1–22 carbon atoms); and (b) $\quad\overset{O}{\underset{\uparrow}{R_1 \cdot S}}\!-\!R_2 \cdot O \cdot (R_3\!-\!O)nH$ (wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

The composition according to the present invention is prepared by means of kneading a compound represented by the foregoing general formulas into a high molecular substance.

Among alkyl sulfide compounds applicable in the present invention that are expressed by the foregoing General Formula a, a compound wherein A represents oxygen can be prepared by causing a long-chain alkyl mercaptan to react with an alkylene oxide such as, for instance, ethylene oxide, propylene oxide, or the like in the presence of caustic alkaline catalyst by a conventional method at a temperature in the range of 100°–130° C. The same can also be prepared by adding an alkylene oxide to a long-chain alkyl β-hydroxyethyl sulfide obtained by combining a hydroxyalkyl mercaptan such as, for instance, β-hydroxyethyl mercaptan as a radical with a long-chain α-olefin in the same way as above.

A compound wherein Z represents COR₄ can be prepared by causing a carboxylic acid chloride or acid anhydride to react with the product prepared as above.

A compound wherein A represents nitrogen can be prepared through the process that: a long-chain alkyl hydroxyalkyl sulfide is prepared by effecting radical reaction between a long-chain olefin and hydroxyalkyl mercaptan by the method mentioned above; subsequently, by adding thionyl chloride to this hydroxyl radical at a low temperature and thereafter heating the admixture to 40° C., a long-chain alkyl chloroalkyl sulfide is produced. By causing this product to react with a dialkanol amine such as, for instance, diethanolamine, and, if necessary, also with alkylene oxide in the presence of caustic alkaline catalyst at 100° C., whereby there is produced a compound to be expressed by the foregoing general formula wherein Z represents hydrogen. A compound prepared through esterification of the foregoing compound by means of a carboxylic acid anhydride or carboxylic acid chloride, such as, for instance, a compound prepared by applying acetic anhydride as an esterifying agent, may also be served for the purpose of the present invention.

Alkyl sulfide compound according to the General Formula b, on the other hand, can be prepared by causing a sulfide according to the General Formula a obtained by the aforesaid method to react with a peroxide such as, for instance, hydrogen peroxide. This reaction is effected, at a high rate of yield, by adding hydrogen peroxide to an aqueous solution or an aqueous dispersion of said sulfide at 50° C.

The foregoing process of preparing the compounds according to the present invention can be expressed by the following chemical formulas, but it is not limited thereby.

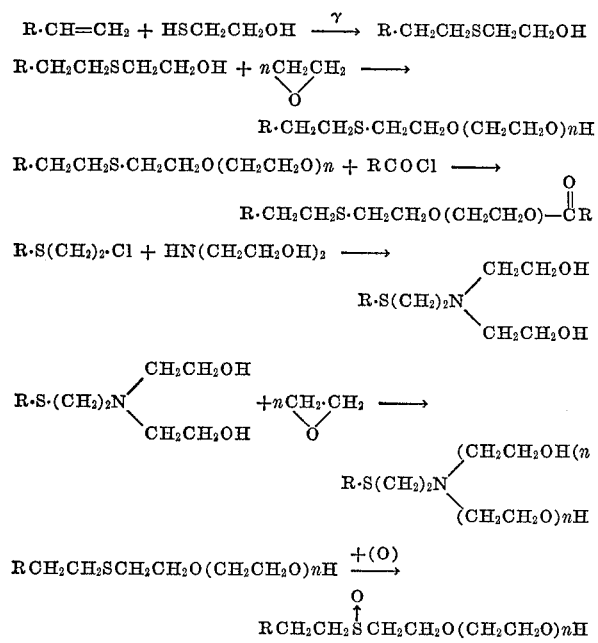

In the foregoing general formula, R₁ represents hydrocarbon radical having 6–22 carbon atoms—preferably having 10–20 carbon atoms. The compound having carbon atoms less than 6 has an unsatisfactory thermal stability as well as compatibility with a high molecular substance such as plastics, while the other compound having carbon atoms more than 23 is currently hard to obtain as a raw material and cannot be employed profitably from an industrial point of view. As to A representing oxygen or nitrogen, it makes little difference whichever is employed, from a viewpoint of efficiency. As to $n$ representing an integer ranging from 0 to 100, in most cases it is desirable that said integer be in the range of 2–50 for moldings such as film, injection-molding product, extrusion-molding product, blow-molding product, etc. and 15–100 for synthetic fibers. However, inasmuch as the integer represented by $n$ is related with R₁, it is advisable that the integer be selected from a fairly wide range, and the integer for synthetic fibers which are generally subjected to frequent washing be bigger than that for molding which are subjected to less frequent washing.

The amount of alkylsulfide to be kneaded into a high molecular substance used in the present invention somewhat varies with the ntaure and shape of a high molecular substance employed, but it is more than about 0.01% of the latter. The optimum amount of said alkyl sulfide to be generally employed for the purpose of antistatic means is in the range of, for instance, 0.01–0.3% for a low-density polyethylene having a density in the range of 0.91–0.93, 0.5–0.7% for a high-density polyethylene having a density in the range of 0.93–0.98, 0.5–1.0% for polypropylene, 1.5–3% for polystyrene, acrylonitrile-butadiene-styrene copolymer (ABS resin), polymethacrylate and acrylonitrile-styrene copolymer (AS resin), 1.5–2.5% for rigid polyvinyl chloride, 0.1–0.5% for non-rigid polyvinyl chloride, and 1.2–5% for a synthetic fiber such as nylon, polyester or polyacrylonitrile.

Suitable high molecular substances applicable in the present invention, include well-known resins or rubbers such as, for instance, polyvinyl acetate, polyamino acid, polyamide, polybutadiene and polyisoprene as well as copolymers and mixtures thereof, besides the aforesaid polymers. Furthermore, high molecular compositions according to the present invention may be mixed with pigment, filler and other additives.

Alkylsulfide for use in a high molecular composition comprising a high molecular substance under the present invention is possessed of not only an excellent antistatic property but also a satisfactory compatibility with a high molecular substance, and is so stable at a high temperature that the transparency or the color tone of the high molecular substance will never get impeded. Besides, it has been found that alkylsulfide is capable of preventing deterioration of the intrinsic property of a high molecular substance against heat, oxidation and light, though the mechanism of this effect of alkylsulfide is yet to be clarified. Further, improvement of the wetting property, abrasiveness and surface polarity of the surface of a high molecular substance and a resultant enhancement of its practical properties such as anti-stain property, anti-fog property, cleansability, adhesiveness, printability, dyeing affinity, flexibility, smoothness, platability for plastic, etc. can be also expected from the employment of said alkylsulfide.

PREFERRED EMBODIMENTS OF THE INVENTION

Given hereunder are concrete examples embodying the present invention. In this connection, the measurement of the antistatic property and so on was conducted according to the following procedures.

Measurement of the antistatic property

A sample is placed within a 10,000-volt electrostatic field to effect electrification, and is thereafter taken out and measured for its charged voltage and half-value period thereof by continuously observing the state of decaying electricity by means of Static Honestometer (a manufacture of Shishido Shokai Co., Japan). In case the half-value period is less than 4 seconds, it is considered that there occurs no such electrostatic troubles as dust-catching, electric shock and the like.

Measurement of compatibility

Under the present circumstances where there is no expedient available for measuring the compatibility of the antistatic agent with a high molecular substance under the examples of the present invention, evaluation is conducted through the procedure that the composition is formed into film, a couple of films thus formed are placed one over the other and left standing under a pressure of 500 g./cm.² for 10 hours, the strippability of thus treated films is compared with the result of a blank test and those so closely stuck to each other and hard to strip off is regarded as "poor." In this context, the antistatic agent employed for the present invention as well as in the prior art is in itself possessed of tackiness, and, therefore, even when kneaded into a high molecular substance, it runs out gradually onto the surface of said substance rendering it tacky. Accordingly, it can be said that the less is the tackiness of the antistatic agent, the better the compatibility thereof.

static pellets by means of a small-sized extrusion-molding machine. Thus obtained pellets were further formed into a 0.01 mm.-thick film by means of a small-sized inflation apparatus. On the other hand, a film was prepared by employing polyethylene alone in the same manner as in the foregoing. When the both films were compared, the charged voltage and half-value period thereof, the compatibility with the plastics, the degree of coloring by heating (at 120° C. for 6 hours), and the contact angle (with droplet of water resting on a film) were as shown in Table 1, respectively. The composition under the present invention not only displayed an improved antistatic property but also proved to be effective as antifog agent due to improved wetting property thereof.

TABLE 1

| Antistatic agent | Amount added (percent) | Static Honestometer Voltage charged (v.) | Static Honestometer Half-value period (sec.) | Degree of coloring after heating at 120° C. for 6 hours | Compatibility | Contact angle (degrees) |
|---|---|---|---|---|---|---|
| Blank test | | 40 | ∞ | 2 | | 90 |
| $C_6H_{13}S \cdot (CH_2CH_2O)_{100}COC_{13}H_{25}$ | 0.1 | 28 | 4.3 | 2 | Good | 40 |
| | 0.3 | 28 | 4.2 | 2 | do | <30 |
| $C_{10}H_{21}S(CH_2CH_2O)_{100}COC_{17}H_{35}$ | 0.1 | 27 | 3.6 | 2 | Good | 52 |
| | 0.3 | 26 | 2.4 | 2 | do | <30 |
| $C_{12}H_{25}S(CH_2CH_2O)_{100}COC_{17}H_{35}$ | 0.1 | 25 | 3.1 | 2 | Good | 35 |
| | 0.3 | 25 | 2.4 | 2 | do | <30 |
| $C_{18}H_{37}S(CH_2CH_2O)_{100}COC_{17}H_{35}$ | 0.1 | 24 | 3.1 | 2 | Good | 40 |
| | 0.3 | 23 | 2.3 | 2 | do | <30 |
| $C_{20}H_{41}S(CH_2CH_2O)_{100}COC_{17}H_{35}$ | 0.1 | 31 | 5.8 | 2 | Good | 32 |
| | 0.3 | 32 | 3.3 | 2 | do | <30 |
| $C_{18}H_{37}S(CH_2CH_2O)_{50}H$ | 0.1 | 28 | 4.0 | 2 | Good | 40 |
| | 0.3 | 26 | 2.2 | 2 | do | <30 |
| $C_{18}H_{37}S(CH_2CH_2O)_{10}H$ | 0.1 | 24 | 2.7 | 2 | Good | <30 |
| | 0.3 | 22 | 1.8 | 2 | do | <30 |
| $C_{18}H_{37}S(CH_2CH_2O)_5H$ | 0.1 | 22 | 1.3 | 2 | Good | <3 |
| | 0.3 | 20 | 0.4 | 2 | do | <30 |
| $C_{18}H_{37}S(CH_2CH_2O)_3H$ | 0.1 | 10 | 0.2 | 2 | Good | <30 |
| | 0.3 | 10 | <0.1 | 2 | do | <30 |
| $C_{13}H_{27}N$<$\begin{array}{c}CH_2CH_2OH\\CH_2CH_2OH\end{array}$ (for comparative use.) | 0.1 | 20 | 0.5 | 4 | Poor | 40 |
| | 0.3 | 10 | <0.1 | 5 | do | <30 |

Measurement of the thermal stability

Samples are placed in a gear oven and heated at 120° C. for a specified hours. Subsequently, the degree of coloring is judged with naked eyes and evaluated by applying a 10-grade criterion whereunder a sample developing no color is regarded as grade 1 while the one most conspicuously developing a color into black is regarded as grade 10.

EXAMPLE 1

A specified amount of the respective antistatic agent listed in Table 1 was added to pellets of a low-density polyethylene (a manufacturer of Mitsubishi Yuka K.K. marketed under the brand name "Yukalon K3215"), mixed therewith by means of Henschel mixer for 3 minutes, and the mixture was subsequently formed into anti-static pellets by means of a small-sized extrusion-molding machine. Thus obtained pellets were further formed into a 0.01 mm.-thick film by means of a small-sized inflation apparatus.

EXAMPLE 2

A specified amount of the respective antistatic agent listed in Table 2 was added to pellets of a high-density polyethylene (a manufacture of Showa Denko K.K. marketed under the brand name "Sholex 5030"), mixed therewith by means of Henschel mixer for 3 minutes, and the mixture was subsequently formed into antistatic pellets by means of a small-sized extrusion-molding machine. Thus obtained pellets were further formed into a 2 mm.-thick sheet by means of an injection-molding machine. On the other hand, a film was prepared by employing polyethylene alone in the same manner as in the foregoing. The result of evaluation conducted in the same way as in Example 1 was shown in Table 2.

TABLE 2

| Antistatic agent | Amount added (percent) | Static Honestometer | | Degree of coloring after heating at 120° C. for 6 hours | Compatibility |
|---|---|---|---|---|---|
| | | Voltage charged (v.) | Half-value period (sec.) | | |
| Blank test | | 40 | ∞ | 2 | |
| $C_{18}H_{37}S(CH_2CH_2O)_{10}H$ | 0.5 | 33 | 4.3 | 2 | Good. |
| | 0.7 | 22 | 1.0 | 2 | Do. |
| $C_{18}H_{37}S(CH_2CH_2O)_2CH_2\overset{\underset{\mid}{CH_3}}{C}HOH$ | 0.5 | 23 | 2.8 | 1 | Good. |
| | 0.7 | 18 | 1.2 | 1 | Do. |
| $C_{18}H_{37}S(CH_2CH_2O)_3H$ | 0.5 | 16 | 0.8 | 1 | Good. |
| | 0.7 | 10 | 0.5 | 1 | Do. |
| $C_{18}H_{37}N\begin{smallmatrix}CH_2CH_2OH\\ \\CH_2CH_2OH\end{smallmatrix}$ | 0.5 | 18 | 0.9 | 5 | Poor. |
| | 0.7 | 12 | 0.5 | 5 | Do. |
| (for comparative use). | | | | | |

EXAMPLE 3

Evaluation was conducted with respect to polypropylene (a manufacture of Mitsubishi Yuka K.K. marketed under the brand name "Mitsubishi Noblene MA-4") in the same way as in Example 2, and the result was as shown in Table 3.

TABLE 3

| Antistatic agent | Amount added (percent) | Static Honestometer | | Degree of coloring after heating at 120° C. for 6 hours | Compatibility |
|---|---|---|---|---|---|
| | | Voltage charged (v.) | Half-value period (sec.) | | |
| Blank test | | 40 | ∞ | 2 | |
| $C_{12}H_{25}S\ CH_2CH_2N\begin{smallmatrix}CH_2CH_2OH\\ \\CH_2CH_2OH\end{smallmatrix}$ | 0.5 | 38 | 4.3 | 2 | Good. |
| | 1.0 | 36 | 2.3 | 2 | Do. |
| $C_{12}H_{25}S\ CH_2CH_2N\begin{smallmatrix}(CH_2CH_2O)_2H\\ \\(CH_2CH_2O)_2H\end{smallmatrix}$ | 0.5 | 32 | 3.6 | 2 | Good. |
| | 1.0 | 30 | 1.7 | 2 | Do. |
| $C_{18}H_{37}S(CH_2CH_2O)_3H$ | 0.5 | 30 | 2.8 | 1 | Good. |
| | 1.0 | 28 | 0.3 | 1 | Do. |
| $C_{18}H_{37}N\begin{smallmatrix}CH_2CH_2OH\\ \\CH_2CH_2OH\end{smallmatrix}$ | 0.5 | 35 | 4.8 | 5 | Poor. |
| | 1.0 | 32 | 1.0 | 5 | Do. |
| (for comparative use). | | | | | |

EXAMPLE 4

Evaluation was conducted with respect to polystyrene (a manufacture of Mitsubishi-Monsanto Kasei K.K. marketed under the brand name "Diarex HF-77"), ABS resin (a manufacture of Mitsubishi-Monsanto Kasei K.K. marketed under the brand name "Lustran"), methyl methacrylate resin (a manufacture of Sumitomo Kagaku K.K. marketed under the trade name "Sumipex Lo"), and acrylonitrile-styrene copolymer resin (a manufacture of Daiseru K.K. marketed under the trade name "Sebian N") in the same way as in Example 2, and the result was as shown in Table 4.

TABLE 4

| Resin | Antistatic agent | Amount of antistatic agent added (percent) | Static Honestometer | | Degree of coloring after heating at 120° C. for 6 hours | Transparency (percent) |
|---|---|---|---|---|---|---|
| | | | Voltage charged (v.) | Half-value period (sec.) | | |
| Polystyrene | Blank test | | 40 | ∞ | 2 | 100 |
| | $C_{10}H_{21}S(CH_2CH_2O)_3H$ | 2.0 | 35 | 4.8 | 1 | 100 |
| | | 3.0 | 22 | 0.8 | 1 | 100 |
| | $C_8H_{17}S(CH_2CH_2O)_3H$ | 2.0 | 36 | 4.0 | 2 | 100 |
| | | 3.0 | 30 | 0.8 | 2 | 100 |
| | $C_{18}H_{37}N\begin{smallmatrix}CH_2CH_2OH\\ \\CH_2CH_2OH\end{smallmatrix}$ | 2.0 | 32 | 5.6 | 5 | 98 |
| | | 3.0 | 32 | 1.2 | 6 | 98 |
| | (for comparative use). | | | | | |

TABLE 4—Continued

| Resin | Antistatic agent | Amount of antistatic agent added (percent) | Static Honestometer | | Degree of coloring after heating at 120° C. for 6 hours | Compatibility |
|---|---|---|---|---|---|---|
| | | | Voltage charged (v.) | Half-value period (sec.) | | |
| Acrylonitrile-butadiene-styrene copolymer (ABS resin). | Blank test | | 40 | ∞ | 2 | |
| | $C_{10}H_{21}S(CH_2CH_2O)_3H$ | 2.0 | 32 | 3.2 | 2 | |
| | | 3.0 | 28 | 0.5 | 2 | |
| | $C_{12}H_{25}S(CH_2CH_2O)_3H$ | 2.0 | 33 | 3.1 | 2 | |
| | | 3.0 | 28 | 0.5 | 2 | |
| | $C_{18}H_{37}N\begin{array}{c}CH_2CH_2OH\\CH_2CH_2OH\end{array}$ | 2.0 | 35 | 4.0 | 5 | |
| | | 3.0 | 30 | 1.0 | 6 | |
| | (for comparative use). | | | | | |
| Acrylonitrile styrene copolymer (ABS resin). | Blank test | | 40 | ∞ | 2 | 100 |
| | $C_{10}H_{21}S(CH_2CH_2O)_3H$ | 2.0 | 35 | 4.5 | 1 | 99 |
| | | 3.0 | 28 | 0.8 | 1 | 98 |
| | $C_8H_{17}S(CH_2CH_2O)_3H$ | 2.0 | 36 | 4.1 | 1 | 99 |
| | | 3.0 | 28 | 0.6 | 2 | 98 |
| | $C_{18}H_{37}N\begin{array}{c}CH_2CH_2OH\\CH_2CH_2OH\end{array}$ | 2.0 | 36 | 5.5 | 5 | 95 |
| | | 3.0 | 31 | 1.1 | 6 | 92 |
| | (for comparative use). | | | | | |
| Polymethyl methacrylate (MMA resin). | Blank test | | 41 | ∞ | 2 | 100 |
| | $C_{10}H_{21}S(CH_2CH_2O)_3H$ | 2.0 | 34 | 4.4 | 2 | 100 |
| | | 3.0 | 27 | 0.8 | 2 | 100 |
| | $C_{12}H_{25}S(CH_2CH_2O)_3H$ | 2.0 | 36 | 4.3 | 2 | 100 |
| | | 3.0 | 28 | 0.7 | 2 | 100 |
| | $C_{18}H_{37}N\begin{array}{c}CH_2CH_2OH\\CH_2CH_2OH\end{array}$ | 2.0 | 37 | 5.2 | 5 | 97 |
| | | 3.0 | 31 | 1.2 | 6 | 97 |
| | (for comparative use). | | | | | |

EXAMPLE 5

A specified amount of the respective antistatic agent listed in Table 5 was added to nylon pellets, mixed therewith by means of Henschel mixer for 3 minutes, and the mixture was subsequently formed into antistatic pellets by means of a small-sized extrusion-molding machine. Thus obtained pellets were further formed into 15-denier filaments by means of a small-sized melt spinning machine. On the other hand, filaments were prepared by employing nylon alone in the same manner as in the foregoing. The result of evaluation of the antistatic efficiency and thermal stability (degree of coloring) of the both filaments was as shown in Table 5.

TABLE 5

| Antistatic agent | Amount added (percent) | Static Honestometer | | Degree of coloring after heating at 120° C. for 6 hours |
|---|---|---|---|---|
| | | Voltage charged (v.) | Half-value period (sec.) | |
| Blank test | | 40 | ∞ | 2 |
| $C_{18}H_{37}S(CH_2CH_2O)_{100}H$ | 1.5 | 38 | 3.8 | 2 |
| | 3.0 | 23 | 1.1 | 2 |
| $C_{18}H_{37}S(CH_2CH_2O)_{80}H$ | 1.5 | 38 | 4.8 | 2 |
| | 3.0 | 26 | 1.6 | 2 |
| $C_{18}H_{37}S(CH_2CH_2O)_{50}H$ | 1.5 | 36 | 4.8 | 2 |
| | 3.0 | 34 | 1.2 | 2 |
| $C_{20}H_{41}S(CH_2CH_2O)_3H$ | 1.5 | 38 | 5.6 | 1 |
| | 3.0 | 22 | 0.8 | 1 |
| $C_{18}H_{37}S(CH_2CH_2O)_{100}\underset{\underset{O}{\|}}{C}C_{17}H_{35}$ | 1.5 | 26 | 4.0 | 2 |
| | 3.0 | 18 | 1.0 | 2 |
| $C_{20}H_{41}S(CH_2CH_2O)_{100}\underset{\underset{O}{\|}}{C}C_{17}H_{35}$ | 1.5 | 23 | 6.0 | 2 |
| | 3.0 | 18 | 1.1 | 2 |
| $C_{18}H_{27}N\begin{array}{c}(CH_2CH_2O)_{50}H\\(CH_2CH_2O)_{50}H\end{array}$ | 1.5 | 40 | >14 | 4 |
| | 3.0 | 36 | 8 | 6 |
| (for comparative use). | | | | |

EXAMPLE 6

Evaluation was conducted with respect to polyester in the same way as in Example 5, and the result was as shown in Table 6.

TABLE 6

| Antistatic agent | Amount added (percent) | Static Honestometer Voltage charged (v.) | Half-value period (sec.) | Degree of coloring after heating at 120° C. for 6 hours |
|---|---|---|---|---|
| Blank test | | 40 | ∞ | 2 |
| $C_{20}H_{41}S(CH_2CH_2O)_{100}\underset{\underset{O}{\|}}{C}C_{17}H_{35}$ | 3.0 | 22 | 1.8 | 2 |
| $C_{18}H_{37}S(CH_2CH_2O)_{50}\underset{\underset{O}{\|}}{C}C_{17}H_{35}$ | 3.0 | 20 | 1.0 | 2 |

EXAMPLE 7

A fixed amount of the respective antistatic agent listed in Table 7 was added to a solution prepared by dissolving 10 parts by weight of acrylonitrile-vinyl chloride copolymer in 100 parts by weight of acetone and thoroughly dissolved therein. The resultant solution was spread on a glass plate and dried with a hot blast, thereby forming a film. The result of evaluation of the antistatic efficiency of thus prepared film was as shown in Table 7.

TABLE 7

| Antistatic agent | Amount added (percent) | Static Honestometer Voltage charged (v.) | Half-value period (sec.) | Degree of coloring after heating at 120° C. for 6 hours |
|---|---|---|---|---|
| Blank test | | 40 | ∞ | 2 |
| $C_{18}H_{37}S(CH_2CH_2O)_{100}\underset{\underset{O}{\|}}{C}C_{17}H_{35}$ | 3.0 | 28 | 2.0 | 2 |
| $C_{18}H_{37}S(CH_2CH_2O)_{50}\underset{\underset{O}{\|}}{C}C_{17}H_{35}$ | 3.0 | 24 | 1.1 | 2 |

EXAMPLE 8

A specified amount of the respective antistatic agent listed in Table 8 was added to a composition comprising 100 parts by weight of polyvinyl chloride powder (a manufacture of Mitsubishi-Monsanto Kasei K.K. marketed under the brand name "Vinika"), 20 parts by weight of dioctyl phthalate (DOP), 1.5 parts by weight of Ba stearate and 0.5 part by weight of Cd stearate, and the mixture was kneaded with a small-sized roll-kneading machine for 5 minutes and formed into a 1 mm.-thick sheet of rigid polyvinyl chloride respectively by means of press-molding. A specified amount of the respective antistatic agent listed in Table 8 was added to a composition comprising 100 parts by weight of polyvinyl chloride powder (a manufacture of Mitsubishi-Monsanto Kasei K.K. marketed under the trade name "Vinika"), 40 parts by weight of DOP, 1.5 parts by weight of Ba stearate and 0.5 part by weight of Cd stearate, and the mixture was kneaded with a small-sized bench roll-kneading machine for 5 minutes and formed into a 1 mm.-thick sheet of non-rigid polyvinyl chloride, respectively, by means of press-molding. These sheets were heated at 120° C. for 2 hours, and the degree of their coloring was surveyed. The result was as shown in Table 8.

TABLE 8

| Resin | Antistatic agent | Amount of antistatic agent added (percent) | Static Honestometer Voltage charged (v.) | Half-value period (sec.) | Degree of coloring after heating at 120° C. for 2 hours | Compatibility |
|---|---|---|---|---|---|---|
| | Blank test | | 40 | ∞ | 4 | |
| | $C_{12}H_{25}S-CH_2CH_2OCH_2\underset{\underset{CH_3}{\|}}{C}HOH$ | 2.0 | 28 | 1.1 | 3 | Good. |
| Rigid PVC | $C_{12}H_{25}S(CH_2CH_2O)_5CH_2\underset{\underset{CH_3}{\|}}{C}HOH$ | 2.0 | 24 | 1.8 | 3 | Good. |
| | $C_{12}H_{25}S(CH_2CH_2O)_3H$ | 2.0 | 22 | 0.7 | 3 | Good. |
| | $C_{20}H_{41}S(CH_2CH_2O)_{10}\underset{\underset{O}{\|}}{C}C_{17}H_{35}$ | 2.0 | 18 | 1.8 | 3 | Good. |
| | $C_{18}H_{37}S(CH_2CH_2O)_3H$ | 2.0 | 12 | 0.1 | 3 | Good. |
| | $C_{18}H_{37}N\begin{array}{l}CH_2CH_2OH\\CH_2CH_2OH\end{array}$ | 2.0 | 18 | 1.0 | 5 | Poor. |

TABLE 8—Continued

| Resin | Antistatic agent | Amount of antistatic agent added (percent) | Static Honestometer Voltage charged (v.) | Static Honestometer Half-value period (sec.) | Degree of coloring after heating at 120° C. for 2 hours | Compatibility |
|---|---|---|---|---|---|---|
| Nonrigid PVC | Blank test | | 40 | ∞ | 4 | |
| | $C_{12}H_{25}S-CH_2CH_2OCH_2\underset{\underset{CH_3}{\mid}}{C}HOH$ | 1.0 | 22 | 1.0 | 3 | Good. |
| | $C_{12}H_{25}S(CH_2CH_2O)_5CH_2\underset{\underset{CH_3}{\mid}}{C}HOH$ | 1.0 | 23 | 0.9 | 3 | Good. |
| | $C_{12}H_{25}S(CH_2CH_2O)_3H$ | 1.0 | 21 | 0.8 | 3 | Good. |
| | $C_{20}H_{41}S(CH_2CH_2O)_{10}\underset{\underset{O}{\parallel}}{C}C_{17}H_{35}$ | 1.0 | 20 | 1.1 | 3 | Good. |
| | $C_{18}H_{37}S(CH_2CH_2O)_3H$ | 1.0 | 12 | 0.1 | 3 | Good. |
| | $C_{18}H_{37}N\begin{smallmatrix}CH_2CH_2OH\\ \\ CH_2CH_2OH\end{smallmatrix}$ (for comparative use). | 1.0 | 21 | 0.9 | 5 | Poor. |

EXAMPLE 9

The antistatic plastics prepared by kneading as in Examples 1, 2 and 3 were subjected to tension test by means of Tensilon universal tension tester (a manufacture of Toyo Sokki K.K.). Further, they were subjected to ultraviolet-ray radiation for 20 hours and 50 hours by means of Weather-O-Meter (a manufacture of Toyo Seiki K.K.), and their elongation and tensile strength were measured thereafter. The results are shown in Table 9 in terms of the numerical value obtained by dividing post-radiation property of matter by pre-radiation property of matter and multiplying the quotient by 100, that is, the preservation ratio of the property of matter. As seen from this table, the property of these compositions are remarkably prevented from getting deteriorated by virtue of kneading therein the compounds according to the present invention.

EXAMPLE 10

The same nylon filament as in Example 5 was wound on a spool repeatedly and the coil of nylon filament was cut off both ends to be a bundle 10 cm. by 5 cm. in dimension. The resultant bundle of nylon filament, upon fixing the both ends thereof by means of a bonding agent lest it should get loosened, was served as a test piece. (This test piece weighed 2.5 gr.)

The foregoing test piece was settled on a retainer while sustained in the form of strain at the both ends thereof, and dipped in a polluting bath below-mentioned at a temperature of 20°–25° C. for 24 hours. Subsequently, thus treated filament coil was taken out from said bath and air-dried, and thereafter, the refractive index thereof was determined by means of a photodiffraction meter. The polluting bath becomes free from foaming by means

TABLE 9

| Resin | Antistatic agent | Amount of antistatic agent added percent | Matter after 100 hours' radiation (percent) Elongation | Matter after 100 hours' radiation (percent) Tensile strength | Matter after 200 hours' radiation (percent) Elongation | Matter after 200 hours' radiation (percent) Tensile strength |
|---|---|---|---|---|---|---|
| Low-density polyethylene. | Blank test | | 47.5 | 53.8 | 22.0 | 28.8 |
| | $C_{18}H_{37}S(CH_2CH_2O)_5H$ | 0.3 | 140.0 | 120.6 | 85.0 | 90.4 |
| | $C_{18}H_{37}S(CH_2CH_2O)_3H$ | 0.3 | 153.0 | 125.6 | 90.6 | 96.3 |
| | $C_{18}H_{37}N(CH_2CH_2OH)_2$ | 0.3 | 56.2 | 54.6 | 27.6 | 29.6 |
| High-density polyethylene. | Blank test | | 52.3 | 58.7 | 25.3 | 29.1 |
| | $C_{18}H_{37}S(CH_2CH_2O)_3H$ | 0.7 | 136.4 | 129.3 | 96.3 | 91.8 |
| | $C_{18}H_{37}N(CH_2CH_2OH)_2$ | 0.7 | 51.1 | 54.4 | 25.4 | 26.3 |
| Polypropylene | Blank test | | 38.4 | 34.6 | | |
| | $C_{18}H_{37}S(CH_2CH_2O)_3H$ | 1.0 | 120.1 | 118.6 | | |
| | $C_{18}H_{37}N(CH_2CH_2OH)_2$ | 1.0 | 31.6 | 35.4 | | | of washing men's soiled underwears (5 pieces of cotton goods) and working clothes (cotton goods; a couple of suits of coat and trousers) with an electric washing machine by using 0.2% aqueous solution of an anionic detergent at 25° C. and thoroughly stirring for 20 minutes. The result was as shown in Table 10. As seen from this table, the compositions according to the present invention are remarkably prevented from pollution. In this connection, the soil additional density (SAD) is equal to $$\log \frac{R_o}{R_s}$$

(wherein $R_o$ represents the initial index of refraction and $R_s$ represents the post-pollution index of fraction).

prepared by employing polyethylene alone in the same manner as in the foregoing. Subsequently, the voltage charged as well as half-value period thereof, the compatibility, the degree of coloring by heating (at 120° C. for 6 hours), and so on were judged for the both films. The result was as shown in Table 11. As seen from this table, the compositions according to the present invention not only demonstrated an improved antistatic property but also proved effective as antifog agents due to improved wetting property thereof.

TABLE 11

| Antistatic agent | Amount added (percent) | Static Honestometer | | Degree of coloring after heating at 120° C. for 6 hours | Compatibility | Contact angle (degrees) |
| --- | --- | --- | --- | --- | --- | --- |
| | | Voltage charged (v.) | Half-value period (sec.) | | | |
| Blank test | | 40 | ∞ | 2 | | 90 |
| $C_{18}H_{37}\overset{O}{\underset{\uparrow}{S}}(CH_2CH_2O)_{50}H$ | 0.1 | 30 | 3.8 | 2 | Good | 53 |
| | 0.3 | 28 | 2.1 | 2 | ...do... | <30 |
| $C_{18}H_{37}\overset{O}{\underset{\uparrow}{S}}(CH_2CH_2O)_{10}H$ | 0.1 | 26 | 2.5 | 2 | Good | 40 |
| | 0.3 | 24 | 1.8 | 2 | ...do... | <30 |
| $C_{18}H_{37}\overset{O}{\underset{\uparrow}{S}}(CH_2CH_2O)_{5}H$ | 0.1 | 24 | 1.0 | 2 | Good | 35 |
| | 0.3 | 22 | 0.2 | 2 | ...do... | <30 |
| $C_{18}H_{37}\overset{O}{\underset{\uparrow}{S}}(CH_2CH_2O)_{3}H$ | 0.1 | 12 | 0.2 | 2 | Good | <30 |
| | 0.3 | 12 | <0.1 | 2 | ...do... | <30 |
| $C_{18}H_{37}N\begin{matrix}CH_2CH_2OH\\CH_2CH_2OH\end{matrix}$ (for comparative use). | 0.1 | 20 | 0.5 | 4 | Poor... | 40 |
| | 0.3 | 1.0 | <0.1 | 5 | ...do... | <30 |

EXAMPLE 12

A specified amount of the respective antistatic agent listed in Table 12 was added to pellets of a high-density polyethylene (a manufacture of Showa Denko K.K. mar-

TABLE 10

| Antistatic agent | Amount added (percent) | Index of refraction | | Soil additional density (SAD ×10⁴) |
| --- | --- | --- | --- | --- |
| | | Initial | Post pollution | |
| Blank test | | 86.4 | 72.9 | 738 |
| $C_{18}H_{37}S(CH_2CH_2O)_{100}H$ | 3.0 | 85.1 | 79.9 | 275 |
| $C_{20}H_{41}S(CH_2CH_2O)_{100}\overset{O}{\underset{\|}{C}}C_{17}H_{35}$ | 3.0 | 86.3 | 81.6 | 241 |

EXAMPLE 11

A specified amount of the respective antistatic agent listed in Table 11 was added to pellets of a low-density polyethylene (a manufacture of Mitsubishi Yuka K.K. marketed under the brand name "Yukalon K3215"), mixed therewith by means of Henschel mixer for 3 minutes, and the respective mixture was subsequently formed into antistatic pellets by means of a small-sized extrusion-molding machine. Thus obtained pellets were further formed into a 0.01 mm.-thick film, respectively, by means of a small-sized inflation apparatus. Another film was keted under the brand name "Shorex 5030"), mixed therewith by means of Henschel mixer for 3 minutes, and the respective mixture was subsequently formed into antistatic pellets by means of a small-sized extrusion-molding machine. Thus obtained pellets were further formed into a 2 mm.-thick sheet, respectively, by means of an injection-molding machine. Another film was prepared by employing polyethylene alone in the same manner as in the foregoing. The result of evaluation conducted for the both films in the same way as in Example 11 was as shown in Table 12.

TABLE 12

| Antistatic agent | Amount added (percent) | Static Honestometer | | Degree of coloring after heating at 120° C. for 6 hours | Compatibility |
| --- | --- | --- | --- | --- | --- |
| | | Voltage charged (v.) | Half-value period (sec.) | | |
| Blank test | | 40 | ∞ | 2 | |
| $C_{18}H_{37}\overset{O}{\underset{\uparrow}{S}}(CH_2CH_2O)_{10}H$ | 0.5<br>0.7 | 32<br>20 | 3.2<br>1.1 | 2<br>2 | Good.<br>Do. |
| $C_{18}H_{37}\overset{O}{\underset{\uparrow}{S}}(CH_2CH_2O)_2 \cdot CH_2\overset{CH_3}{\underset{\uparrow}{C}}HO$ | 0.5<br>0.7 | 24<br>19 | 2.6<br>1.0 | 2<br>2 | Good.<br>Do. |
| $C_{18}H_{37}\overset{O}{\underset{\uparrow}{S}}(CH_2CH_2O)_3H$ | 0.5<br>0.7 | 18<br>12 | 0.8<br>0.5 | 2<br>2 | Good.<br>Do. |
| $C_{18}H_{37}N\diagup^{CH_2CH_2OH}_{\diagdown CH_2CH_2OH}$ (for comparative use). | 0.5<br>0.7 | 18<br>12 | 0.9<br>0.5 | 5<br>5 | Poor.<br>Do. |

EXAMPLE 13

Evaluation was conducted with respect to polypropylene (a manufacture of Mitsubishi Yuka K.K. marketed under the brand name "Mitsubishi Noblene MA–4") in the same way as in Example 12, and the result was as shown in Table 13.

manufacture of Mitsubishi-Monsanto Kasei K.K. marketed under the brand name "Lustran"), methyl methacrylate resin (a manufacture of Sumitomo Kagaku K.K. marketed under the brand name "Sumipex LO"), and acrylonitrile-

TABLE 13

| Antistatic agent | Amount employed (percent) | Static Honestometer | | Degree of coloring after heating at 120° C. for 6 hrs. | Compatibility |
| --- | --- | --- | --- | --- | --- |
| | | Voltage charged (v.) | Half-value period (sec.) | | |
| Blank test | | 40 | ∞ | 2 | |
| $C_{18}H_{37}\overset{O}{\underset{\uparrow}{S}}(CH_2CH_2O)_3H$ | 0.5<br>1.0 | 30<br>28 | 3.3<br>0.2 | 1<br>1 | Good.<br>Do. |
| $C_{18}H_{37}N\diagup^{CH_2CH_2OH}_{\diagdown CH_2CH_2OH}$ (for comparative use). | 0.5<br>1.0 | 32<br>32 | 5.6<br>1.2 | 5<br>5 | Poor.<br>Do. |

EXAMPLE 14

Evaluation was conducted with respect to polystyrene (a manufacture of Mitsubishi-Monsanto Kasei K.K. marketed under the brand name "Diarex HF"), ABS resin (a styrene copolymer resin (a manufacture of Daiseru K.K. marketed under the brand name "Sebian-N") in the same way as in Example 12, and the result was as shown in Table 14.

TABLE 14

| Resin | Antistatic agent | Amount of antistatic agent added (percent) | Static Honestometer | | Degree of coloring after heating at 120° C. for 6 hrs. | Transparency (percent) |
| --- | --- | --- | --- | --- | --- | --- |
| | | | Voltage charged (v.) | Half-value period (sec.) | | |
| Polystyrene | Blank test | | 40 | ∞ | 2 | 100 |
| | $C_{10}H_{21}\overset{O}{\underset{\uparrow}{S}}(CH_2CH_2O)_3H$ | 2.0<br>3.0 | 35<br>26 | 4.4<br>1.0 | 2<br>2 | 100<br>100 |
| | $C_6H_{13}\overset{O}{\underset{\uparrow}{S}}(CH_2CH_2O)_3H$ | 2.0<br>3.0 | 34<br>28 | 3.8<br>0.9 | 2<br>2 | 100<br>100 |
| | $C_{18}H_{37}N\diagup^{CH_2CH_2OH}_{\diagdown CH_2CH_2OH}$ (for comparative use). | 2.0<br>3.0 | 32<br>32 | 5.6<br>1.2 | 5<br>6 | 98<br>98 |
| ABS resin | Blank test | | 40 | ∞ | 2 | |
| | $C_{10}H_{21}\overset{O}{\underset{\uparrow}{S}}(CH_2CH_2O)_3H$ | 2.0<br>3.0 | 34<br>26 | 2.8<br>0.6 | 2<br>2 | |
| | $C_{18}H_{37}N\diagup^{CH_2CH_2OH}_{\diagdown CH_2CH_2OH}$ (for comparative use). | 2.0<br>3.0 | 35<br>30 | 4.0<br>1.0 | 5<br>6 | |

TABLE 14—Continued

| Resin | Antistatic agent | Amount of antistatic agent added (percent) | Static Honestometer | | Degree of coloring after heating at 120° C. for 6 hrs. | Transparency (percent) |
|---|---|---|---|---|---|---|
| | | | Voltage charged (v.) | Half-value period (sec.) | | |
| AS resin | Blank test | | 40 | ∞ | 2 | 100 |
| | $C_{10}H_{21}\overset{O}{\underset{\uparrow}{S}}(CH_2CH_2O)_3H$ | 2.0<br>3.0 | 34<br>28 | 4.5<br>0.9 | 2<br>2 | 99<br>99 |
| | $C_{16}H_{33}\overset{O}{\underset{\uparrow}{S}}(CH_2CH_2O)_3H$ | 2.0<br>3.0 | 35<br>28 | 4.2<br>0.7 | 2<br>2 | 99<br>98 |
| | $C_{18}H_{37}N\begin{matrix}CH_2CH_2OH\\ \\CH_2CH_2OH\end{matrix}$ (for comparative use). | 2.0<br>3.0 | 36<br>31 | 5.0<br>1.3 | 5<br>6 | 95<br>93 |
| MMA resin | Blank test | | 40 | ∞ | 2 | 100 |
| | $C_8H_{17}\overset{O}{\underset{\uparrow}{S}}(CH_2CH_2O)_3H$ | 2.0<br>3.0 | 34<br>26 | 4.7<br>0.9 | 2<br>2 | 100<br>100 |
| | $C_{18}H_{37}\overset{O}{\underset{\uparrow}{S}}(CH_2CH_2O)_3H$ | 2.0<br>3.0 | 38<br>29 | 4.2<br>0.8 | 2<br>2 | 100<br>100 |
| | $C_{18}H_{37}N\begin{matrix}CH_2CH_2OH\\ \\CH_2CH_2OH\end{matrix}$ (for comparative use). | 2.0<br>3.0 | 36<br>31 | 5.4<br>2.1 | 5<br>6 | 95<br>95 |

EXAMPLE 15

A specified amount of the respective antistatic agent listed in Table 15 was added to nylon pellets, mixed therewith by means of Henschel mixer for 3 minutes, and the respective mixture was subsequently formed into antistatic pellets by means of a small-sized extrusion-molding machine. Thus obtained pellets were further formed into a 15-denier filament respectively by means of a small-sized melt spinning machine. The result of evaluation of the antistatic efficiency and thermal stability (degree of coloring) of these filaments was as shown in Table 15.

TABLE 15

| Antistatic agent | Amount added (percent) | Static Honestometer | | Degree of coloring [1] |
|---|---|---|---|---|
| | | Voltage charged (v.) | Half-value period (sec.) | |
| Blank test | | 40 | ∞ | 2 |
| $C_{18}H_{37}\overset{O}{\underset{\uparrow}{S}}(CH_2CH_2O)_{100}H$ | 1.5<br>3.0 | 36<br>26 | 3.5<br>1.3 | 2<br>2 |
| $C_{18}H_{37}\overset{O}{\underset{\uparrow}{S}}(CH_2CH_2O)_{80}H$ | 1.5<br>3.0 | 34<br>32 | 4.4<br>1.2 | 2<br>2 |
| $C_{18}H_{37}\overset{O}{\underset{\uparrow}{S}}(CH_2CH_2O)_{50}H$ | 1.5<br>3.0 | 34<br>28 | 4.6<br>1.4 | 2<br>2 |
| $C_{18}H_{37}\overset{O}{\underset{\uparrow}{S}}(CH_2CH_2O)_3H$ | 1.3<br>3.0 | 37<br>20 | 5.8<br>1.0 | 2<br>2 |
| $C_{18}H_{37}N\begin{matrix}(CH_2CH_2O)_{50}H\\ \\(CH_2CH_2O)_{50}H\end{matrix}$ (for comparative use). | 1.5<br>3.0 | 40<br>36 | 71.4<br>8 | 4<br>6 |

[1] After heating at 120° C. for 6 hours.

EXAMPLE 16

Evaluation was conducted with respect to polyester in the same way as in Example 15. The result was as shown in Table 16.

TABLE 16

| Antistatic agent | Amount added (percent) | Static Honestometer | | Degree of coloring [1] |
|---|---|---|---|---|
| | | Voltage charged (v.) | Half-value period (sec.) | |
| Blank test | | 40 | ∞ | 2 |
| $C_{18}H_{37}\overset{O}{\underset{\uparrow}{S}}(CH_2CH_2O)_{100}H$ | 3.0 | 26 | 2.4 | 2 |
| $C_{18}H_{37}\overset{O}{\underset{\uparrow}{S}}(CH_2CH_2O)_{50}H$ | 3.0 | 25 | 1.3 | 2 |

[1] After heating at 120° C. for 6 hours.

EXAMPLE 17

A specified amount of the respective antistatic agent listed in Table 17 was added to a solution prepared by dissolving 10 parts by weight of acrylonitrile-vinyl chloride copolymer in 100 parts by weight of acetone and thoroughly dissolved therein. The resultant solution was spread on a glass plate and dried with a hot blast, thereby forming a film. The result of evaluation of the antistatic efficiency of thus prepared film was as shown in Table 17.

TABLE 17

| Antistatic agent | Amount added (percent) | Static Honestometer | | Degree of coloring [1] |
|---|---|---|---|---|
| | | Voltage charged (v.) | Half-value period (sec.) | |
| Blank test | | 40 | ∞ | 2 |
| $C_{18}H_{37}\overset{O}{\underset{\uparrow}{S}}(CH_2CH_2O)_{100}H$ | 3.0 | 26 | 2.1 | 2 |
| $C_{18}H_{37}\overset{O}{\underset{\uparrow}{S}}(CH_2CH_2O)_{50}H$ | 3.0 | 25 | 1.2 | 2 |

[1] After heating at 120° C. for 6 hours.

EXAMPLE 18

A specified amount of the respective antistatic agent listed in Table 18 was added to a composition comprising 100 parts by weight of polyvinyl chloride (a manufacture of Mitsubishi-Monsanto Kasei K.K. marketed under the brand name "Vinika"), 20 parts by weight of DOP, 1.5 parts by weight of Ba stearate and 0.5 part by weight of Cd stearate, and the mixture was kneaded with a small-sized roll-kneading machine for 5 minutes and formed into a 1 mm.-thick sheet of rigid polyvinyl chloride, respectively, by means of press-molding. Another specified amount of the respective antistatic agent listed in Table 18 was added to a composition comprising 100 parts by weight of polyvinyl chloride powder (a manufacture of Mitsubishi-Monsanto Kasei K.K. marketed under the brand name "Vinika"), 40 parts by weight of DOP, 1.5 parts by weight of Ba stearate and 0.5 part by weight of Cd stearate, and the mixture was kneaded with a small-sized roll-kneading machine for 5 minutes and formed into a 1 mm.-thick sheet of non-rigid polyvinyl chloride, respectively, by means of press-molding. Subsequently, these sheets were heated at 120° C. for 2 hours, and the degree of their coloring was surveyed. The result was as shown in Table 18.

TABLE 18

| Resin | Antistatic agent | Amount added (percent) | Static Honestometer Voltage charged (v.) | Static Honestometer Half-value period (sec.) | Degree of coloring after heating at 120° C. for 2 hrs. | Compatibility |
|---|---|---|---|---|---|---|
| Rigid PVC | Blank test | | 40 | ∞ | 4 | |
| | $C_{12}H_{25}\overset{O}{\overset{\uparrow}{S}} CH_2CH_2O CH_2\overset{CH_3}{\overset{\uparrow}{C}}HOH$ | 2.0 | 26 | 1.3 | 3 | Good. |
| | $C_{12}H_{25}\overset{O}{\overset{\uparrow}{S}} (CH_2CH_2O)_3CH_2\overset{CH_3}{\overset{\uparrow}{C}}HOH$ | 2.0 | 22 | 1.6 | 3 | Do. |
| | $C_{12}H_{25}\overset{O}{\overset{\uparrow}{S}} (CH_2CH_2O)_3H$ | 2.0 | 20 | 0.1 | 3 | Do. |
| | $C_{18}H_{37}\overset{O}{\overset{\uparrow}{S}} (CH_2CH_2O)_3H$ | 2.0 | 14 | 0.1 | 3 | Do. |
| | $C_{18}H_{37}N \begin{array}{l} CH_2CH_2OH \\ CH_2CH_2OH \end{array}$ (for comparative use). | 2.0 | 18 | 1.0 | 5 | Poor. |
| Nonrigid PVC | Blank test | | 35 | 25.0 | 4 | |
| | $C_{12}H_{25}\overset{O}{\overset{\uparrow}{S}} CH_2CH_2O CH_2\overset{CH_3}{\overset{\uparrow}{C}}HOH$ | 1.0 | 18 | 1.0 | 3 | Good. |
| | $C_{12}H_{25}\overset{O}{\overset{\uparrow}{S}} (CH_2CH_2O)_3CH_2\overset{CH_3}{\overset{\uparrow}{C}}HOH$ | 1.0 | 16 | 0.8 | 3 | Do. |
| | $C_{12}H_{25}\overset{O}{\overset{\uparrow}{S}} (CH_2CH_2O)_3H$ | 1.0 | 18 | 1.1 | 3 | Do. |
| | $C_{18}H_{37}\overset{O}{\overset{\uparrow}{S}} (CH_2CH_2O)_3H$ | 1.0 | 17 | 0.8 | 3 | Do. |
| | $C_{18}H_{37}N \begin{array}{l} CH_2CH_2OH \\ CH_2CH_2OH \end{array}$ (for comparative use). | 1.0 | 20 | 1.0 | 5 | Poor. |

EXAMPLE 19

The antistatic plastics prepared by kneading as in Examples 1, 2 and 3 were subjected to tests for elongation and tensile strength subsequent to ultraviolet-ray radiation for 20 hours and 50 hours by means of Tensilon universal tension tester (a manufacture of Toyo Seiki K.K.). The results are shown in Table 19 in terms of the preservation ratio (viz numerical value obtained by dividing post-radiation property of matter by pre-radiation property of matter and multiplying the quotient by 100). As seen from this table, the compositions according to the present invention are remarkably effective in preventing the deterioration of polyethylene and polypropylene.

TABLE 19

| Resin | Antistatic agent | Amount of antistatic agent added (percent) | Preservation ratio of property of matter after 100 hrs. radiation (percent) Elongation | Preservation ratio of property of matter after 100 hrs. radiation (percent) Tensile strength | Preservation ratio of property of matter after 200 hrs. radiation Elongation | Preservation ratio of property of matter after 200 hrs. radiation Tensile strength |
|---|---|---|---|---|---|---|
| Low density polyethylene | Blank test | | 47.5 | 53.8 | 22.0 | 28.8 |
| | $C_{18}H_{37}\overset{O}{\overset{\uparrow}{S}} (CH_2CH_2O)_5H$ | 0.3 | 130.4 | 111.1 | 80.3 | 88.2 |
| | $C_{18}H_{37}\overset{O}{\overset{\uparrow}{S}} (CH_2CH_2O)_3H$ | 0.3 | 144.6 | 115.4 | 85.7 | 92.3 |
| | $C_{18}H_{37}N(CH_2CH_2OH)_2$ | 0.3 | 56.2 | 54.6 | 27.6 | 29.6 |

TABLE 19—Continued

| Resin | Antistatic agent | Amount of antistatic agent added (percent) | Preservation ratio of property of matter after 100 hrs. radiation (percent) | | Preservation ratio of property of matter after 200 hrs. radiation | |
|---|---|---|---|---|---|---|
| | | | Elongation | Tensile strength | Elongation | Tensile strength |
| High density polyethylene | Blank test | | 52.3 | 58.7 | 25.3 | 29.1 |
| | $C_{18}H_{37}\overset{O}{\underset{\uparrow}{S}}(CH_2CH_2O)_3H$ | 0.7 | 126.4 | 119.7 | 91.4 | 87.3 |
| | $C_{18}H_{37}N(CH_2CH_2OH)_2$ | 0.7 | 51.1 | 54.4 | 25.4 | 26.3 |
| Polypropylene | Blank test | | 38.4 | 34.6 | | |
| | $C_{18}H_{37}\overset{O}{\underset{\uparrow}{S}}(CH_2CH_2O)_3H$ | 1.0 | 110.6 | 110.5 | | |
| | $C_{18}H_{37}N(CH_2CH_2OH)_2$ | 1.0 | 31.6 | 35.4 | | |

EXAMPLE 20

The same nylon filament as in Example 15 was wound on a spool repeatedly and the coil of nylon filament was cut off both ends to be a bundle 10 cm. by 5 cm. in dimension. The resultant bundle of nylon filament, upon fixing the both ends thereof by means of a bonding agent lest it should get loosened, was served as a test piece. (This test piece weighed 2.5 gr.)

The foregoing test piece was settled on a retainer while sustained in the form of strain at the both ends thereof, and dipped in a polluting bath below-mentioned at a temperature of 20°–25° C. for 24 hours. Subsequently, thus treated filament coil was taken out from said bath and air-dried, and thereafter, the refractive index thereof was determined by means of a photodiffraction meter. The polluting bath becomes free from foaming by means of washing therein men's soiled underwears (5 pieces of cotton goods) and working clothes (cotton goods; a couple of suits of coat and trousers) with an electric washing machine by using 0.2% aqueous solution of an anionic detergent at 25° C. and thoroughly stirring for 20 minutes. The result was as shown in Table 20. As seen from this table, the compositions according to the present invention are remarkably prevented from pollution. In this connection, the soil additional density (SAD) is equal to $$\log \frac{R_o}{R_s}$$

(wherein $R_o$ represents the initial index of refraction and $R_s$ represents the post-pollution index of refraction).

TABLE 20

| Antistatic agent | Amount added (percent) | Index of refraction | | Soil additional density (SAD ×10⁴) |
|---|---|---|---|---|
| | | Initial | Post-pollution | |
| Blank test | | 86.4 | 72.9 | 738 |
| $C_{18}H_{37}\overset{O}{\underset{\uparrow}{S}}(CH_2CH_2O)_{100}H$ | 3.0 | 86.5 | 85.4 | 59 |
| $C_{18}H_{37}\overset{O}{\underset{\uparrow}{S}}(CH_2CH_2O)_{80}H$ | 3.0 | 86.8 | 83.1 | 191 |
| $C_{18}H_{37}\overset{O}{\underset{\uparrow}{S}}(CH_2CH_2O)_{50}H$ | 3.0 | 86.7 | 82.5 | 216 |

What we claim is:

1. A composition consisting essentially of a high molecular weight synthetic moldable thermoplastic polymer and as an anti-static agent, one member selected from the group consisting of compounds being expressed by the following General Formulas a and b:

(a) $\quad R_1 \cdot S \cdot R_2 \cdot A \cdot (R_3{-}O)nZ$ (wherein $R_1$ represents a hydrocarbon radical having 6–22 carbon atoms; $R_2$ and $R_3$ each represents a hydrocarbon radical having 1–4 carbon atoms; A represents one member selected from the group consisting of oxygen and nitrogen, and, in case A represents nitrogen, said general formula is represented by $$R_1{\cdot}S{\cdot}R_2{\cdot}N{\diagup}^{(R_3-O)nZ}_{\diagdown(R_3-O)nZ}$$

$n$ represents an integer in the range of 0–100; and Z represents one member selected from the group consisting of hydrogen and $COR_4$ wherein $R_4$ represents a hydrocarbon radical having 1–22 carbon atoms); and (b) $\quad R_1 \overset{O}{\underset{\uparrow}{-}S}{-}R_2 \cdot O(R_3{-}O)nH$ (wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

2. A composition according to claim 1, wherein the amount of said member is more than about 0.01% by weight.

3. A high molecular composition consisting essentially of polyethylene having a density in the range of 0.91–0.93, said polyethylene containing as an anti-static agent 0.01–0.3% weight of one member selected from the group consisting of compounds expressed by the following General Formulas a and b:

(a) $\quad R_1 \cdot S_2 \cdot A \cdot (R_3{-}O)nZ$ (wherein $R_1$ represents a hydrocarbon radical having 6–22 carbon atoms; $R_2$ and $R_3$ each represents a hydrocarbon radical having 1–4 carbon atoms; A represents one member selected from the group consisting of oxygen and nitrogen, and, in case A represents nitrogen, said general formula is represented by $$R_1{\cdot}S{\cdot}R_2{\cdot}N{\diagup}^{(R_3-O)nZ}_{\diagdown(R_3-O)nZ}$$

$n$ represents an integer in the range of 0–100; and Z represents one member selected from the group consisting of hydrogen and $COR_4$ wherein $R_4$ represents hydrocarbon radical having 1–22 carbon atoms); and (b) $\quad R_1 \overset{O}{\underset{\uparrow}{-}S}{-}R_2 \cdot O(R_3{-}O)nH$ (wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

4. A high molecular composition consisting essentially of polyethylene having a density in the range of 0.93–0.98, said polyethylene containing as anti-static agent 0.5–0.7% by weight of one member selected from the group consisting of compounds expressed by the following General Formulas a and b:

(a) $\quad R_1 \cdot S \cdot R_2 \cdot A \cdot (R_3-O)nZ$ (wherein $R_1$ represents a hydrocarbon radical having 6–22 carbon atoms; $R_2$ and $R_3$ each represents a hydrocarbon radical having 1–4 carbon atoms; A represents one member selected from the group consisting of oxygen and nitrogen, and, in case A represents nitrogen, said general formula is represented by

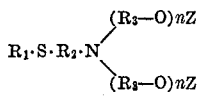

$n$ represents an integer in the range of 0–100, and Z represents one member selected from the group consisting of hydrogen and $COR_4$ wherein $R_4$ represents a hydrocarbon radical having 1–22 carbon atoms); and (b)
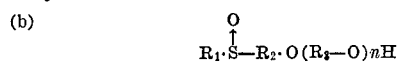

(wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

5. A high molecular composition consisting essentially of polypropylene containing as an anti-static agent 0.5–1.0% by weight of one member selected from the group consisting of compounds expressed by the following General Formulas a and b:

(a) $\quad R_1 \cdot S \cdot R_2 \cdot A \cdot (R_3-O)nZ$ (wherein $R_1$ represents a hydrocarbon radical having 6–22 carbon atoms; $R_2$ and $R_3$ each represents a hydrocarbon radical having 1–4 carbon atoms; A represents one member selected from the group consisting of oxygen and nitrogen, and, in case A represents nitrogen, said general formula is represented by

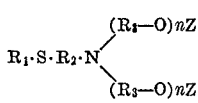

$n$ represents an integer in the range of 0–100; and Z represents one member selected from the group consisting of hydrogen and $COR_4$ wherein $R_4$ represents a hydrocarbon radical having 1–22 carbon atoms); and (b)
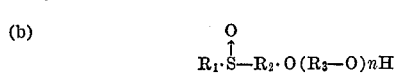

(wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

6. A high molecular composition consisting essentially of one member selected from the group consisting of polystyrene, acrylonitrile-butadiene-styrene copolymer, polymethylmethacrylate and acrylonitrile-styrene copolymer and containing as an anti-static agent 1.5–3% by weight of one member selected from the group consisting of compounds expressed by the following General Formulas a and b:

(a) $\quad R_1 \cdot S \cdot R_2 \cdot A \cdot (R_3-O)nZ$ (wherein $R_1$ represents a hydrocarbon radical having 6–22 carbon atoms; $R_2$ and $R_3$ each represents a hydrocarbon radical having 1–4 carbon atoms; A represents one member selected from the group consisting of oxygen and nitrogen, and, in case A represents nitrogen, said general formula is represented by

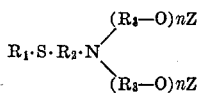

$n$ represents an integer in the range of 0–100; and Z represents one member selected from the group consisting of hydrogen and $COR_4$ wherein $R_4$ represents a hydrocarbon radical having 1–22 carbon atoms); and (b)

(wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

7. A high molecular composition consisting essentially of rigid polyvinyl chloride containing as an antistatic agent 1.5–2.5% by weight of one member selected from the group consisting of compounds expressed by the following General Formulas a and b:

(a) $\quad R_1 \cdot S \cdot R_2 \cdot A \cdot (R_3-O)nZ$ (wherein $R_1$ represents a hydrocarbon radical having 6–22 carbon atoms; $R_2$ and $R_3$ each represents a hydrocarbon radical having 1–4 carbon atoms; A represents one member selected from the group consisting of oxygen and nitrogen, and, in case A represents nitrogen, said general formula is represented by

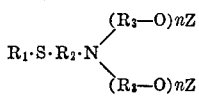

$n$ represents an integer in the range of 0–100; and Z represents one member selected from the group consisting of hydrogen and $COR_4$ wherein $R_4$ represents a hydrocarbon radical having 1–22 carbon atoms); and (b)

(wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

8. A high molecular composition consisting essentially of non-rigid polyvinyl chloride containing as an anti-static agent 0.1–0.5% by weight of one member selected from the group consisting of compounds expressed by the following General Formulas a and b:

(a) $\quad R_1 \cdot S \cdot R_2 \cdot A \cdot (R_3-O)nZ$ (wherein $R_1$ represents a hydrocarbon radical having 6–22 carbon atoms; $R_2$ and $R_3$ each represents a hydrocarbon radical having 1–4 carbon atoms; A represents one member selected from the group consisting of oxygen and nitrogen, and, in case A represents nitrogen, said general formula is represented by

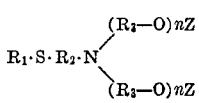

$n$ represents an integer in the range of 0–100; and Z represents one member selected from the group consisting of hydrogen and $COR_4$ wherein $R_4$ represents a hydrocarbon radical having 1–22 carbon atoms); and (b)
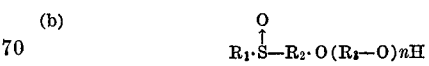

(wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

9. A high molecular composition consisting essentially of a synthetic fiber forming high molecular weight modable thermoplastic polymer and containing an anti-static agent 1.2–5% by weight of one member selected from the group consisting of compounds expressed by the following General Formulas a and b:

(a) $\quad R_1 \cdot S \cdot R_2 \cdot A \cdot (R_3\text{—}O)n Z$ (wherein $R_1$ represents a hydrocarbon radical having 6–22 carbon atoms; $R_2$ and $R_3$ each represents a hydrocarbon radical having 1–4 carbon atoms; A represents one member selected from the group consisting of oxygen and nitrogen, and, in case A represents nitrogen, said general formula is represented by

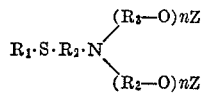

$n$ represents an integer in the range of 0–100; and Z represents one member selected from the group consisting of hydrogen and $COR_4$ wherein $R_4$ represents a hydrocarbon radical having 1–22 carbon atoms); and (b)

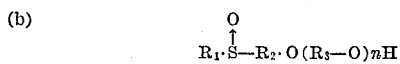

(wherein $R_1$ represents a hydrocarbon radical having 6–22 carbon atoms; $R_2$ and $R_3$ each represents a hydrocarbon radical having 1–4 carbon atoms; and $n$ represents an integer in the range of 0–100).

References Cited
UNITED STATES PATENTS 2,727,004    12/1955    Cohen _____ 260—DIG. 019

JAMES A. SEIDLECK, Primary Examiner

J. A. DONAHUE, Jr., Assistant Examiner

U.S. Cl. X.R.

260—75 T, 78 S, 80.7, 85.5 HC, 88.7, 89.5 S, 93.5 A, 93.7, 94.7 S, 94.9 G, 584, 607, DIG. 15, DIG. 19

UNITED STATES PATENT OFFICE
CERTIFICATE OF CORRECTION

Patent No. 3,705,139          Dated December 5, 1972

Inventor(s) Izumi Yamane, Masuzo Nagayama and Makoto Takai

It is certified that error appears in the above-identified patent and that said Letters Patent are hereby corrected as shown below:

Column 24, line 50; after "0.3%" insert ---by---.

Column 24, line 54; change the formula to read $$R_1 \cdot S \cdot R_2 \cdot A \cdot (R_3-O)nZ$$

Column 27, line 3; after "containing" insert ---as---.

Signed and sealed this 29th day of May 1973.

(SEAL)
Attest:

EDWARD M. FLETCHER, JR.           ROBERT GOTTSCHALK
Attesting Officer                 Commissioner of Patents